(12) United States Patent
Wunderlich et al.

(10) Patent No.: US 6,584,573 B1
(45) Date of Patent: Jun. 24, 2003

(54) PLACING A COMPUTER SYSTEM INTO A SLEEPING STATE

(75) Inventors: Russ Wunderlich, Olympia, WA (US); Yan Li, Olympia, WA (US); Mani Ayyar, Cupertino, CA (US); Gary N. Hammond, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/385,204

(22) Filed: Aug. 30, 1999

(51) Int. Cl.[7] ................ G06F 1/26; G06F 1/32
(52) U.S. Cl. .................... 713/322; 713/323
(58) Field of Search ................ 713/322, 323; 710/8, 104

(56) References Cited

U.S. PATENT DOCUMENTS

| | | |
|---|---|---|
| 4,847,720 A | 7/1989 | Dezonno |
| 5,375,247 A | 12/1994 | Hueser |
| 5,410,711 A * | 4/1995 | Stewart .................. 713/322 |
| 5,623,677 A | 4/1997 | Townsley et al. |
| 5,757,773 A | 5/1998 | Tsuji |
| 5,978,923 A | 11/1999 | Kou |
| 6,122,748 A * | 9/2000 | Hobson .................. 713/323 |
| 6,266,776 B1 | 7/2001 | Sakai |

OTHER PUBLICATIONS

*www.teleport.com* web page, "Global System State Definitions".

* cited by examiner

*Primary Examiner*—Thomas Lee
*Assistant Examiner*—Eric Chang
(74) *Attorney, Agent, or Firm*—Fish & Richardson P.C.

(57) ABSTRACT

A computer system enters or exits a sleeping state, such as the ACPI "S1" state, in response to a sleep or wake event. Upon detecting the sleep or wake event, a system component generates a sleep or wake signal that instructs the computer to enter or exit the sleeping state. This sleep or wake signal is of a type to which the computer's processor does not respond. Therefore, a PMI signal is asserted in response to the sleep or wake signal. The PMI signal, when asserted, causes the processor to halt program execution.

20 Claims, 4 Drawing Sheets

PLACING A COMPUTER SYSTEM INTO A SLEEPING STATE

TECHNOLOGICAL FIELD

The invention relates to placing a computer system into a sleeping state.

BACKGROUND

The "Advanced Configuration and Power Interface Specification" ("ACPI Specification"), version 1.0, published in February 1998, by Intel Corporation, Microsoft Corporation, and Toshiba K.K., defines several sleeping states that allow a computer to enter one of several reduced power modes with a corresponding level of system context preservation. One of these sleeping states, the "S1" state, is associated with low wake-up latency and full system context preservation.

For most computers, the "S1" state is a "stop clock" state, in which the computer's processor "snoops" transactions between other computer components to maintain cache coherency, but the processor itself does not carry out transactions. A wide variety of events typically cause a computer to exit the "S1" sleeping state, including wake events from the computer's real-time clock, from PCI devices such as modems and network interface cards (NICs), from USB compliant peripherals such as keyboards and multimedia components, and from the computer's power-wake button, or front panel switch.

Some computer systems, such as those based on the Intel 32-bit (IA-32) architecture, include a simple "hardware handshake" mechanism that supports low wake-up latency sleeping states like the "S1" state. This mechanism involves the assertion and deassertion of a control signal, known as the STPCLK# signal, each time a system sleep event or a recognized wake event occurs. The computer's processor receives the STPCLK# signal directly and, in response to assertion of the signal, temporarily halts program execution.

Other computer systems, such as those based on the Intel 64-bit (IA-64) architecture, are not designed to support low wake-up latency sleeping states like the "S1" state. In particular, processors that implement the IA-64 architecture do not recognize the STPCLK# signal and therefore do not enter a sleeping state when the STPCLK# signal is asserted. Therefore, these systems do not comply with the "PC 99 System Design Guide" ("PC 99"), published by Intel Corporation and Microsoft Corporation in August 1998, which requires the system to support the ACPI "S1" sleeping state.

SUMMARY

The systems and techniques described here allow computer manufacturers to support low wake-up latency sleeping states, such as the ACPI "S1" state, in computer systems not originally designed to support such states. One resulting benefit is that only minor modifications are needed to bring existing computer architectures into compliance with the PC 99 standard. For example, the Intel IA-64 architecture becomes PC 99 compliant by adding only a few hardware components and modifying the operation of system BIOS only slightly.

The invention involves a computer's entry into or exit from a sleeping state, such as the ACPI "S1" state, in which program execution halts. Upon detecting a sleep or wake event, a system component generates a sleep or wake signal that instructs the computer to enter or exit the sleeping state. This sleep or wake signal is of a type to which the computer's processor does not respond. Therefore, another system component, such as BIOS, takes steps that cause the processor to halt program execution.

Other embodiments and advantages will become apparent from the following description and from the claims.

DETAILED DESCRIPTION

Figure 1:
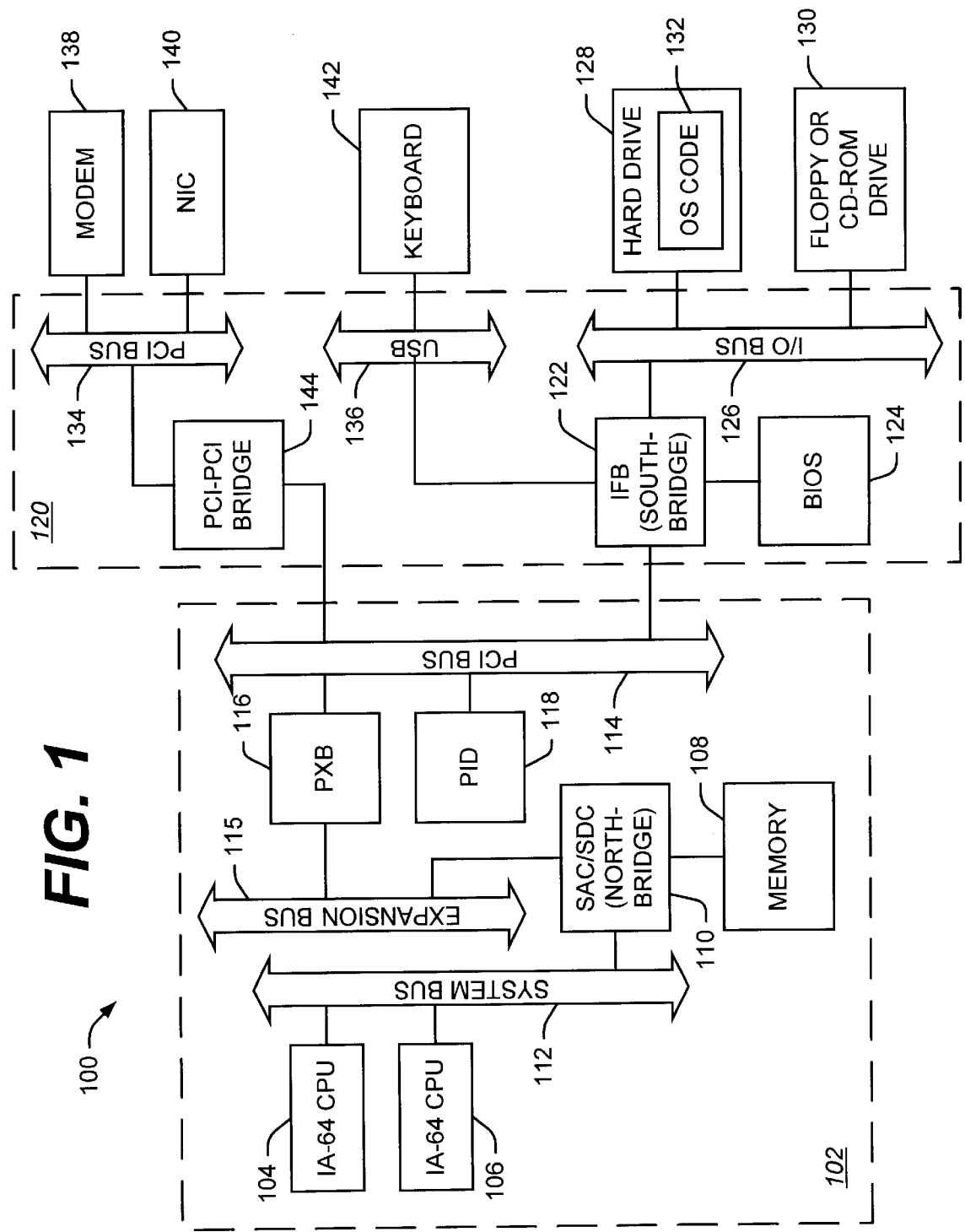
FIG. 1 is a functional block diagram of a computer system with no hardware handshake to support low wake-up latency sleeping states.

FIG. 1 shows a computer system 100 that does not support low wake-up latency sleeping states, such as the ACPI "S1" state. A wide variety of computer architectures are not designed to support such sleeping states. One such architecture is the Intel 64-bit (IA-64) architecture.

The computer system 100 includes a baseboard 102 that holds several of the computer's most critical components, including one or more central processing units (CPUs) 104, 106, a memory unit 108, and a system address and data controller (SAC/SDC) 110. The system address and data controller 110 controls the flow of data between the CPUs 104, 106 and other system components, including memory 108, over a system bus 112. In this example, the system address and data controller 110 performs what is known as "northbridge functionality." In many systems, the CPUs 104, 106 and the memory unit 108 reside on printed circuit cards that mount on the baseboard 102 and thus do not reside on the baseboard 102 directly.

The baseboard 102 also includes an expansion bus 115 and a peripheral (PCI) bus 114, which complies with a version of the "Peripheral Component Interface Specification," published by the PCI Special Interest Group. The expansion bus 115 supports transactions between the components on the system bus 112 and other system components, such as those described below. A PCI expansion bridge (PXB) 116 facilitates communication between the expansion bus 115 and the PCI bus 114. A programmable interrupt device (PID) 118 is connected to the PCI bus 114 to manage delivery of interrupt requests to the CPUs 104, 106.

Another key system component is an input/output (I/O) firmware bridge (IFB) 122, which often resides on an I/O printed circuit card 120 mounted to the baseboard 102. Among other things, the I/O firmware bridge 122 manages the interaction between the computer's basic input/output system (BIOS) 124, or firmware, and the components on the baseboard 102. The I/O firmware bridge 122 also generates interrupt signals that are handled by the programmable interrupt device 118 on the baseboard 102. In this example, the I/O firmware bridge 122 performs what is known as "southbridge functionality."

The I/O card 120 also includes one or more data buses that support communication between the baseboard 102 and one or more peripheral components. One such bus is an I/O bus 126, on which the computer's hard drive 128 and CD-ROM drives 130 reside. The hard drive 128 stores, among other things, the computer's operating system (OS) code 132, which, upon boot-up, is loaded into the computer's memory unit 108 for execution by the processors 104, 106.

Other buses on the I/O board 120 often include a PCI bus 134 and a universal serial bus (USB) 136, to which peripheral devices such as a modem 138, a network interface card (NIC) 140, and a keyboard 142 often connect. Some signals from these types of devices are recognized as wake events for low wake-up latency sleeping states, such as the ACPI "S1" state. In some systems, PCI-to-PCI bridge 144 facilitates communication between the PCI bus 134 on the I/O board 120 and the PCI bus 114 on the baseboard 102.

U) As described below, the I/O firmware bridge 122 responds to a recognized sleep/wake event by asserting or deasserting an interrupt signal, known as the STPCLK# signal. In PC 99compliant computer systems, such as those implementing the Intel IA-32 architecture, the I/O firmware bridge delivers the STPCLK# signal directly to the processor. Upon receiving this signal, the processor enters or exits the low wake-up latency sleeping state. In other systems, such as those implementing the Intel IA-64 architecture, the processor does not recognize the STPCLK# signal and therefore does not enter or exit a sleeping state in response to the STPCLK# signal. The "S1" sleep/wake events include signals from the computer's real-time clock, from PCI devices such as modems and network interface cards (NICs), from USB compliant peripherals such as keyboards and multimedia components, from devices, such as keyboards or mice, connected to the computer's serial ports, and from the computer's power-wake button, or front panel switch.

Figure 2:
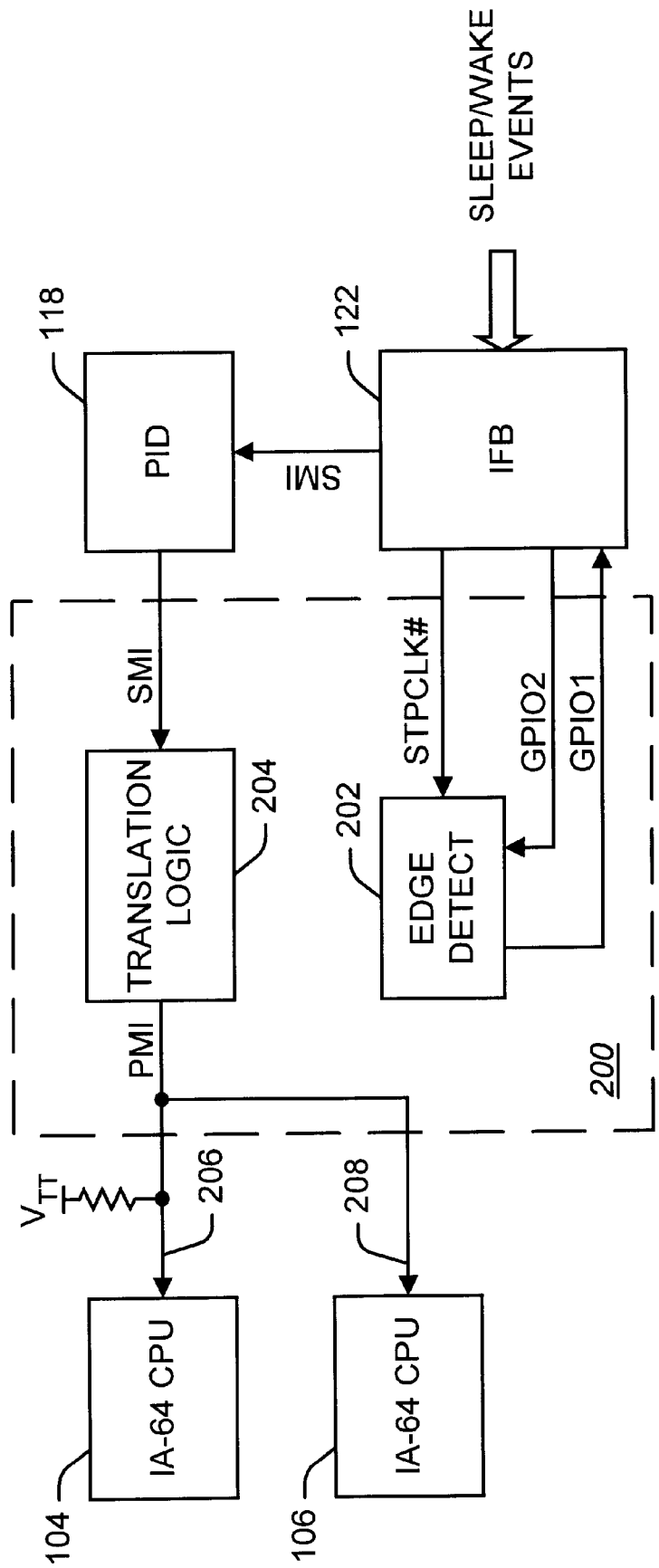
FIG. 2 is a schematic diagram of a computer system like that of FIG. 1 modified to support low wake-up latency sleeping states.

FIG. 2 illustrates a simple sleep circuit 200 that, when added to the computer system of FIG. 1, enables support of the "S1" sleeping state. This circuit 200 provides a mechanism for recognizing assertion or deassertion of the STPCLK# signal and allowing the computer's basic input/output system (BIOS) to place the computer system in the "S1" reduced power state. The circuit 200 includes an edge detect circuit 202 that receives the STPCLK# signal directly from the I/O firmware bridge 122 and asserts a general purpose I/O signal (GPIO1) upon detecting a falling or rising edge in the STPCLK# signal. The I/O firmware bridge 122 receives the GPIO1 signal and, in response to this signal, asserts a system management interrupt (SMI) signal through the PID 118. The I/O firmware bridge 122 is programmed to assert or deassert the STPCLK# signal only in response to recognized "S1" sleep/wake events, such as those described above.

The I/O firmware bridge 122 also asserts a general-purpose I/O signal (GPIO2) of its own, as described below. This signal resets the edge detect circuit 202, thus preparing the edge detection circuit 202 to respond to the next rising or falling edge of the STPCLK# signal.

The sleep circuit 200 also includes a block of translation logic 204 that receives the SMI signal from the PID 118 and converts this signal into a standard platform management interrupt (PMI) signal. In general, the SMI signal is of a logic type, such as low-voltage TTL (LVTTL), that the processors 104, 106 do not recognize. The translation logic 204 converts the signal to a logic type, such as GTL, recognized by the processors 104, 106. In many systems, as shown here, the translation logic 204 provides the PMI signal directly to a PMI input pin on each of the processors 104, 106 over dedicated wires 206, 208. The sleep circuit 200 need not include the translation logic 204 if the I/O firmware bridge,122 and the processors 104, 106 use compatible logic types.

In some computer systems, the I/O firmware bridge 122 delivers the SMI signal to the computer's programmable interrupt device 118. Doing so allows the computer manufacturer to route the SMI signal to the processors 104, 106 over the PCI and system buses (not illustrated in FIG. 2) instead of through dedicated wires. In the example of FIG. 2, the SMI signal passes through the programmable interrupt device 118 directly to the translation logic 204 and the processors.104, 106, bypassing the PCI bus.

Generating a PMI signal in this manner allows BIOS-controlled entry into or exit from a low power state through the processor's HALT facility. In particular, asserting the PMI signal invokes the PMI Handler in the computer's basic input/output system (BIOS). In some embodiments, the PMI Handler acknowledges assertion of the STPCLK# signal by emitting a STOPGNT bus cycle required by the IFB to advance its internal state machine. The PMI Handler then invokes a firmware function to place the processor in the HALT state. This causes some processors, including those in the Intel IA-64 family, to cease program execution. While the processors remain in the HALT state, the system stays in the ACPI "S1" sleeping state.

Figure 3:
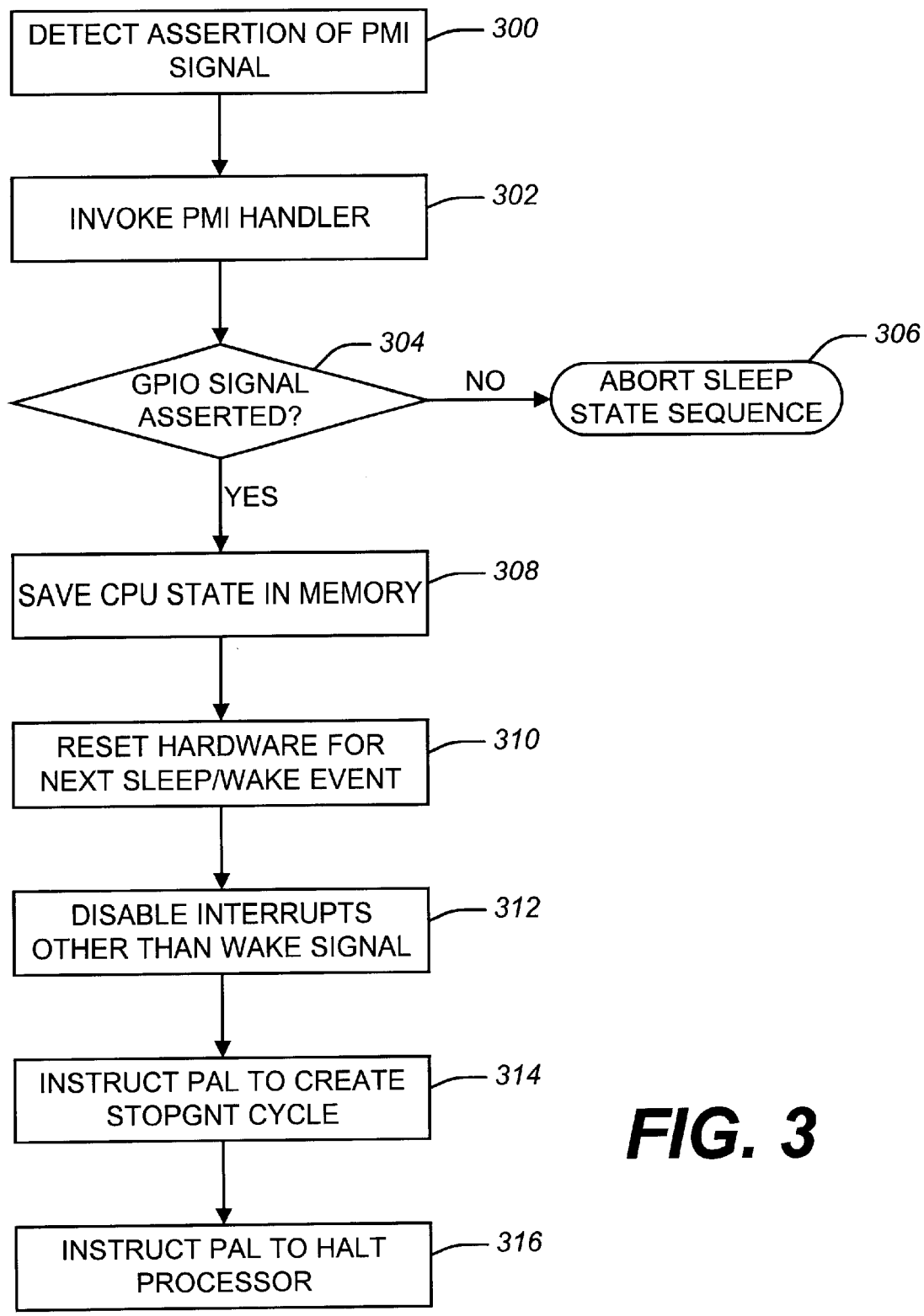
FIGS. 3 and 4 are flowcharts of BIOS operations that support entry into and exit from a low wake-up latency sleeping state.

FIG. 3 illustrates the operation of the computer system 100, and in particular the computer's basic input/output system (BIOS), in response to a recognized sleep event. Upon detecting assertion of the PMI signal generated by the translation logic (step 300), the computer's processors invoke the BIOS PMI Handler (step 302). Because many events other than sleep/wake events can trigger a PMI signal, the PMI Handler first verifies that a recognized sleep event was indeed the cause of the PMI signal. To do so, the PMI Handler checks the GPIO1 signal from the edge detect circuit (step 304). If this signal is not asserted, the PMI signal did not result from a recognized sleep event, and the PMI Handler aborts the sleeping state sequence (step 306).

Upon concluding that a recognized sleep event indeed caused PMI signal assertion, the PMI Handler begins the sleeping state sequence. The PMI Handler first stores the current processor states in memory (step 308). The PMI Handler then performs any hardware cleanup that is necessary to prepare the computer for a recognized wake event (step 310). Included in this cleanup is an instruction to the I/O firmware bridge to assert the GPIO2 signal. Asserting the GPIO2 signal causes the edge detect circuit to reset and to clear the GPIO1 signal, which the edge detect circuit asserts in response to a change in the STPCLK# signal, as described above.

The PMI Handler then disables all system interrupts other than PMI signals asserted in response to recognized wake events (step 312). Doing so ensures that the computer system will exit the HALT state only upon detecting an event that is allowed to wake the computer from the sleeping state. In the case of an "S1" sleeping state, the PMI Handler disables all interrupts other than those resulting from an ACPI-approved "S1" wake event. The processor status and local SAPIC registers in the CPU and the I/O SAPIC register in the programmable interrupt device are among the tools that allow the PMI Handler to disable interrupts.

After disabling the interrupts, the PMI Handler instructs the Processor Abstraction Layer (PAL) to generate a sleeping state acknowledgement transaction, known as a STOPGNT cycle (step 314). This signal notifies the I/O firmware bridge that the processors are entering the sleeping state. One technique for generating a CPU-independent STOPGNT cycle is by calling an application programmer's interface (API) routine within the PAL firmware layer that generates the cycle. The PMI Handler then instructs the PAL to place each processor in the HALT state (step 316). At this point, the PAL assumes control of the system.

Figure 4:
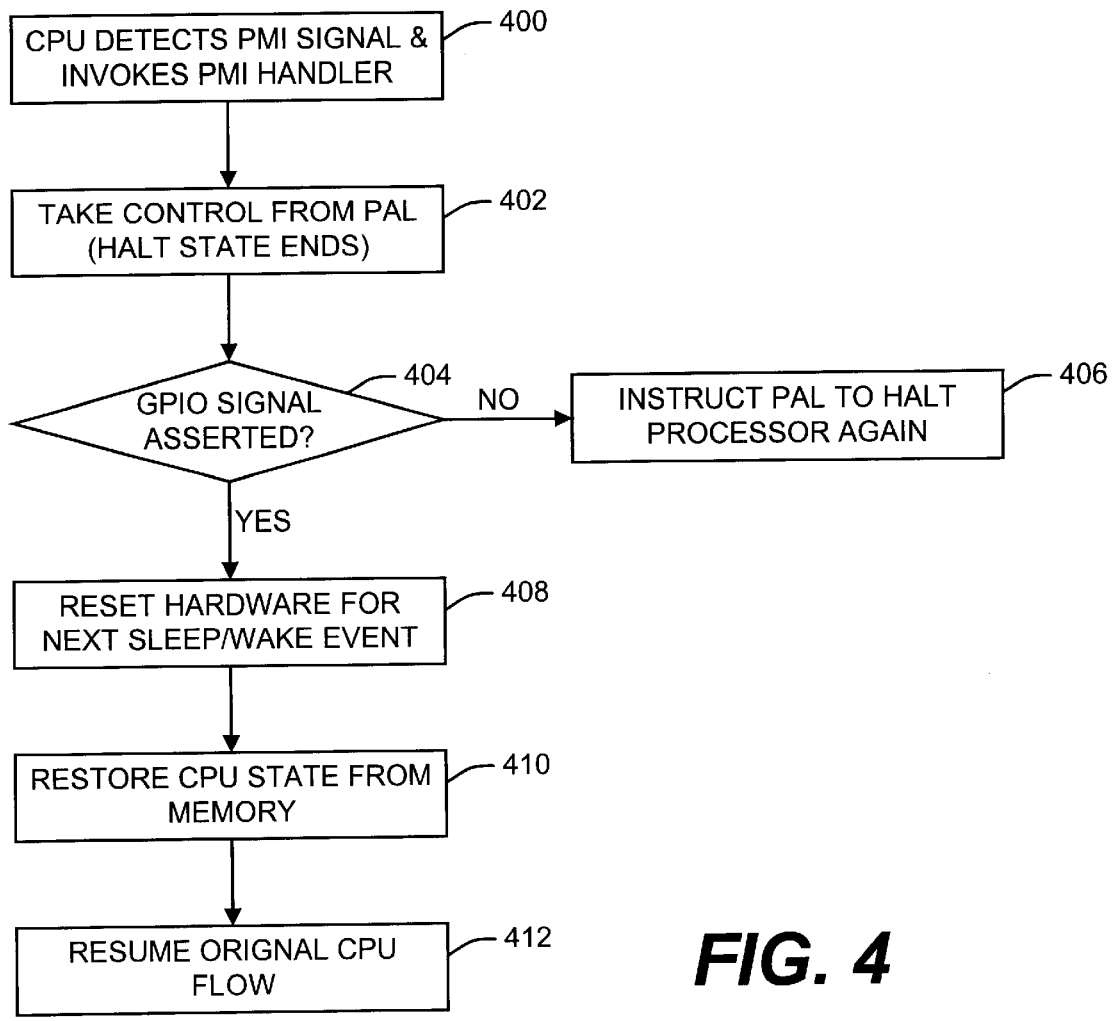

FIG. 4 illustrates the operation of the computer system 100 in response to a recognized wake event. The I/O firmware bridge deasserts the STPCLK# signal and then, using the GPIO1 signal, causes generation of the PMI signal. The processors wake upon detecting the PMI signal and invoke the PMI Handler (step 400). The PMI Handler regains control of the system from the PAL (step 402), which causes the processors to exit the HALT state. The PMI Handler then checks the GPIO1 signal to verify that a recognized wake event indeed caused the PMI signal (step 404). If the GPIO1 signal is not asserted, the PMI Handler instructs the PAL to place the processors in the HALT state (step 406), and PAL again assumes control of the system. Otherwise, the PMI Handler continues waking the computer system.

In waking the system, the PMI Handler first performs any hardware cleanup that is needed to prepare the computer for the next recognized sleep event, including assertion of the GPIO2 signal and reset of the edge detection circuit (step 408). The PMI Handler then restores the processor states from memory (410), and the processors resume their original flow (step 412).

Other embodiments and advantages are within the scope of the following claims. For example, while the invention has been described primarily in terms of the Intel IA-64 architecture and the ACPI "S1" sleeping state, hardware and firmware changes similar to those described apply to other system architectures and other low power states. In other embodiments, the edge detect circuit is replaced by level sensitive inputs into the PID. In some multiprocessor embodiments, only one processor receives the PMI signal. This processor then sends an interprocessor interrupt signal to the other processors on the system bus with the PMI type and sets a memory semaphore indicating the reason for the PMI. The processors receiving the PMI examine the value in the memory semaphore and take actions to enter and/or exit the CPU sleep state.

What is claimed is:

1. A computer system comprising:
   a sleep management component that generates a sleep signal instructing the computer to enter a sleeping state in which program execution ceases;
   a central processor of the computer that is not configured to respond to the sleep signal; and
   a system management component, including the computer's basic input/output system (BIOS), that is configured, in response to the sleep signal, to place the processor in a halt state in which program execution ceases.

2. The computer system of claim 1, wherein the processor is configured to maintain cache coherency in the sleeping state.

3. The computer system of claim 1, wherein the system management component includes a program abstraction layer (PAL) configured to place the processor in the halt state in response to a BIOS call.

4. The computer system of claim 3, wherein the PAL is configured to generate a STOPGNT cycle to indicate that program execution will cease.

5. The computer system of claim 1, wherein the sleep management component comprises an I/O firmware bridge that asserts a STPCLK signal in response to the sleep event.

6. The computer system of claim 1, wherein the processor implements the Intel IA-64 architecture.

7. The system of claim 1, wherein the sleep signal instructs the computer to enter the ACPI "S1" sleeping state.

8. The system of claim 1, further comprising one or more additional processors configured to halt program execution in response to the sleep signal.

9. The system of claim 8, wherein the processor is configured to receive a PMI signal from the system management component and deliver the PMI signal to the additional processors.

10. A computer system comprising:
    a processor having no STPCLK pin;
    a peripheral bus connected to a peripheral device that is operable to generate sleep and wake events;
    an I/O firmware bridge that is coupled to the peripheral bus to receive the sleep and wake events generated by the peripheral device and that is configured to assert or deassert a STPCLK signal and assert a system management interrupt (SMI) signal upon receiving one of the sleep or wake events;
    an edge detection circuit connected to receive the STPCLK signal and configured to:
        assert a general purpose input/output (GPIO) signal upon detecting a rising or falling edge of the STPCLK signal; and
        deliver the GPIO signal to the I/O firmware bridge to trigger assertion of the SMI signal; and
    a basic input/output system (BIOS) that is configured to place the processor in or remove the processor from a HALT state in response to the SMI signal.

11. The computer system of claim 10, further comprising a translation circuit connected to receive the SMI signal and configured to generate a platform management interrupt (PMI) signal in response to the SMI signal.

12. The computer system of claim 11, wherein the processor is connected to receive the PMI signal and configured to invoke the BIOS in response to the PMI signal.

13. A computer system comprising:
    a sleep management component that generates a wake signal instructing the computer to exit a sleeping state in which program execution ceases;
    a central processor of the computer that is configured to enter a halt state while the computer is in the sleeping state and that is not configured to respond to the wake signal; and
    a system management component, including the computer's basic input/output system (BIOS), that is configured, in response to the wake signal, to remove the processor from the halt state.

14. A method for use in placing a computer system in a low power state comprising:
    detecting a sleep event indicating that the computer system should enter the low power state;
    asserting a STPCLK signal in response to the sleep event;
    asserting a platform management interrupt (PMI) signal in response to the STPCLK signal; and
    halting program execution in response to the PMI signal.

15. The method of claim 14, further comprising generating a system management interrupt (SMI) signal before generating the PMI signal.

16. The method of claim 14, further comprising invoking a PMI handling routine in the computer's basic input/output system (BIOS) in response to the PMI signal.

17. The method of claim 13, further comprising, after halting program execution, detecting a wake event indicating that the computer should exit the low power state.

18. The method of claim 17, further comprising deasserting the STPCLK signal in response to the wake event and, in response to deassertion of the STPCLK signal, resuming program execution.

19. The method of claim 18, wherein resuming program execution includes asserting the PMI signal.

20. The method of claim 19, further comprising invoking a PMI handling routine in the computer's basic input/output system (BIOS) in response to the PMI signal.

* * * * *